US008706692B1

(12) United States Patent
Luthra et al.

(10) Patent No.: US 8,706,692 B1
(45) Date of Patent: Apr. 22, 2014

(54) CORPORATE INFRASTRUCTURE MANAGEMENT SYSTEM

(75) Inventors: Ramit Luthra, Plainsboro, NJ (US); Jason A. Lombardo, Basking Ridge, NJ (US); Tian You Wang, Fair Lawn, NJ (US); Michael Gresh, Annandale, NJ (US); David Brusowankin, Teaneck, NJ (US)

(73) Assignee: Citibank, N.A., New York, NY (US)

( * ) Notice: Subject to any disclaimer, the term of this patent is extended or adjusted under 35 U.S.C. 154(b) by 365 days.

(21) Appl. No.: 12/704,681

(22) Filed: Feb. 12, 2010

(51) Int. Cl.
*G06F 17/30* (2006.01)

(52) U.S. Cl.
USPC .......................................... 707/622

(58) Field of Classification Search
CPC .......................... G06F 17/305; G06F 17/30209
USPC ......... 707/736, 737, 738, 740, 741, 802, 805, 707/940, 944, 949, 950, 610, 613, 617, 619, 707/620, 633, 634, 656, 622; 711/147, 150, 711/163
See application file for complete search history.

(56) References Cited

U.S. PATENT DOCUMENTS

| | | | | |
|---|---|---|---|---|
| 2006/0004875 | A1* | 1/2006 | Baron et al. | 707/200 |
| 2009/0012981 | A1* | 1/2009 | Kogoh | 707/101 |
| 2009/0037452 | A1* | 2/2009 | Baitalmal et al. | 707/101 |
| 2011/0010339 | A1* | 1/2011 | Wipfel et al. | 707/610 |
| 2011/0029767 | A1* | 2/2011 | Ayachitula et al. | 713/100 |
| 2011/0047206 | A1* | 2/2011 | Spears | 709/203 |

OTHER PUBLICATIONS

Fontana, Microsoft touts groundbreaking 'clip-on' for Active Directory, SQL-based add-on offers capabilities never before available in directory, Network World, 2009, downloaded from the internet at http://www.networkworld.com/news/2009/111809-microsoft-active-directory.html?page=1 on Dec. 28, 2011, 3 pages.
Fontana, Microsoft beta to shake up directory services, Developers to bake access control into applications, Techworld, 2009, downloaded from the internet at http://news.techworld.com/applications/3206762/microsoft-beta-to-shake-up-directory-services?olo=rss on Dec. 28, 2011, 2 pages.

* cited by examiner

*Primary Examiner* — Pierre Vital
*Assistant Examiner* — Evan Aspinwall
(74) *Attorney, Agent, or Firm* — Eric L. Sophir; Dentons US LLP

(57) ABSTRACT

CIMS can provide users with essential resources; provide a mechanism for instantly creating, modifying, and delivering infrastructure data that used to take hours or days; improve the efficiency of systems interfacing with it while reducing costly infrastructure; ensure audit and regulatory requirements are satisfied by automatically creating and recording a history of all application transactions; eliminate the cost overhead and human error associated with manual, time-consuming work currently performed by many systems administrators on each disparate system; and be transparent to end users, thereby defraying the costs of time off the job normally incurred with retraining CIMS offers the functionality of the disparate applications and consistently interfaces with the underlying infrastructure. As a result, infrastructure providers do not have to communicate directly with a vast array of business applications. Instead, infrastructure service providers and client applications can focus on being more productive in the development lifecycle.

23 Claims, 4 Drawing Sheets

CORPORATE INFRASTRUCTURE MANAGEMENT SYSTEM

TECHNICAL FIELD

The present application relates generally to managing infrastructure data as it relates to data center management, directory services, information security, expense/cost management, and other information.

BACKGROUND

Conventionally, companies have disparate information systems and software that are used to run back-office operations and complex technology infrastructure. Though each system is implemented for its ability to serve a specific function, like procurement or enterprise reporting, there are many systems that rely on the same source of data in order to be used to their full potential, like employee data. The data sources, such as directory services and Enterprise Resource Planning ("ERP") systems, can be third party (e.g., provided by a vendor) or proprietary (e.g., developed by the company) systems. Infrastructure data consists of information about an organization's technology (e.g., the inventory, configuration, ownership, financials of laptops, desktops, servers, switches, and routers) and back-office information (e.g., procurement and billing, accounting and general ledger, employee and department). The disparate nature and management of the data sources—semantics, timeliness, and reliability—create a mesh of information that can be redundant, inaccurate, or out-dated. Where information should be entered into a single golden source and shared with other applications, the same information might be manually keyed into multiple systems or automatically updated with significant time delays. Therefore, it is difficult or time-consuming to figure out inter alia which resources an employee has access to for business-as-usual activities, the costs associated with running an infrastructure, or the risk associated with the action of giving access to a person for a particular resource. It is also very easy to hide or lose critical information in this mesh, so by accurately determining how an organization's people, places, and things are related to each other, it can significantly improve its operational efficiency, which may also become a source of competitive advantage.

In any company of any size or location, a user cannot easily access a single location for all infrastructure information. Instead, data must be compiled from disparate sources, cleansed, and organized. In some instances, the user does not even know where to obtain the data for compilation. Once the data is obtained, the data is sometimes outdated because it has not been consistently refreshed. As a result, access, quality, and reliability of infrastructure data remain a challenge. It is desirable to have a single interface for handling infrastructure data.

Extract, transform, load ("ETL") can be used to pull data from a database into another system. First, the extract function reads data from a specified source database and extracts a desired subset of data. Next, the transform function works with the acquired data—using rules or lookup tables, or creating combinations with other data—to convert it to the desired state. Finally, the load function is used to write the resulting data (either all of the subset or just the changes) to a target database, which may or may not previously exist. ETL can be used to acquire a temporary subset of data for reports or other purposes, or a more permanent data set may be acquired for other purposes, including the population of a data mart or data warehouse; conversion from one database type to another; and the migration of data from one database or platform to another. However, ETL usage also suffers deficiencies. While ETL can replicate data for another database, ETL does not have the functionality of managing and processing requests, obtaining approval, and managing infrastructure data from directory services. Another problem with ETL is that it provides a snapshot of data representative of a specific point in time, and, conventionally, could experience latency that could be days, weeks, or months. ETL is generally a poor method to capture changes in data that occur more frequently, such as a few seconds or several minutes. Without real-time access to information, reporting and decision-making might be based on old information. Therefore, it is desirable to have a system that manages the morass of infrastructure quickly, efficiently, securely, and in compliance with regulatory requirements.

SUMMARY OF THE INVENTION

It is desirable to provide a solution that is robust and can failover without noticeable impact to users or applications; connect disparate enterprise-wide infrastructure applications with similar data; automate legacy manual infrastructure management processes that currently require thousands of staff hours; prevent different enterprise applications from developing one-off non-standard solutions for acquiring and manipulating infrastructure data; ensure infrastructure data stored in regional and business silos is accurate source data and usable by enterprise-level applications; ascertain that processes managing this dispersed infrastructure data are compliant with audit and regulatory requirements; reduce expenses related to managing these widely-dispersed applications; increase the range of employee self-service options that previously required manual intervention by system administrators, technology specialists, security staff, engineers, software developers or help desk staff; and fully secure the core infrastructure assets despite the thousands of system administrators entitled to access them. The systems and methods described herein attempt to provide this desirable solution. The solution also attempts to eliminate disparate infrastructure applications and systems, prevent non-standard solutions, enhance information in a standardized fashion, automate legacy manual processes, reduce expenses, and protect the infrastructure.

The solution allows application developers to more easily integrate systems by getting disparate data from a single source. Conventionally, it is not uncommon in organizations to find multiple copies of the same information stored and managed within various departments. In some cases, large sets of data are copied whereas the end-user only requires a small subset of these data. This leads to unnecessarily high expenses for storage and support costs of these data. It may also increase the probability of poor data quality as each copy must be maintained by separate groups which do not follow common data governance models. Accordingly, the solution described herein presents a "one-stop shop" for developers to access secure, well-organized infrastructure data.

Various embodiments described herein attempt to overcome the drawbacks of the conventional systems and methods. In one exemplary embodiment, a computer implemented method for managing infrastructure data comprises replicating, by a server, secure data from one or more infrastructure data sources into a centralized database in a generic format; receiving, by the server, a request from at least one client application to write data to the one or more infrastructure data sources; writing, by the server, the requested data to the one or more infrastructure data sources; and synchronizing, by the server, the centralized database with the one or more infrastructure data sources.

In another exemplary embodiment, a computer implemented method for managing entitlements comprises replicating, by a server, secure data from one or more infrastructure data sources into a centralized database in a generic format; determining, by the server, an actual state of a user; determining, by the server, a required state of the user; comparing, by the server, the actual state of the user with the required state of the user; if the user is not entitled to the required state, then the one or more infrastructure data sources are not updated to reflect the required state of the user, or if the user is entitled to the required state, then updating, by the server, one or more infrastructure data sources to reflect the required state of the user; and updating, by the server, the centralized database based on the update to the one or more infrastructure data sources.

In yet another exemplary embodiment, a system for managing infrastructure data comprises at least one system resource comprising infrastructure data; at least one client application for requesting or accessing the infrastructure data from the at least one system resource; an infrastructure presentation tier for presenting an interface with the at least one client application; a business tier for providing services through the infrastructure presentation tier to the at least one client application; and a data tier for accessing information from or writing information to internal and external resources at the request of at least one client application.

In another embodiment, a computer implemented method for accessing effective membership of a user in one or more infrastructure data sources comprises replicating, by a server, secure data from one or more infrastructure data sources into a centralized database in a generic format; receiving, by the server, a selection of a user; collecting all direct memberships of the user; collecting all indirect memberships of the user; and providing, by the server, a list of all direct and indirect memberships of the user.

Additional features and advantages of an embodiment will be set forth in the description which follows, and in part will be apparent from the description, or may be learned by practice of the invention. The objectives and other advantages of the invention will be realized and attained by the structure particularly pointed out in the exemplary embodiments in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The preferred embodiments of the present invention are illustrated by way of example and not limited to the following figures.

DETAILED DESCRIPTION

Figure 1:
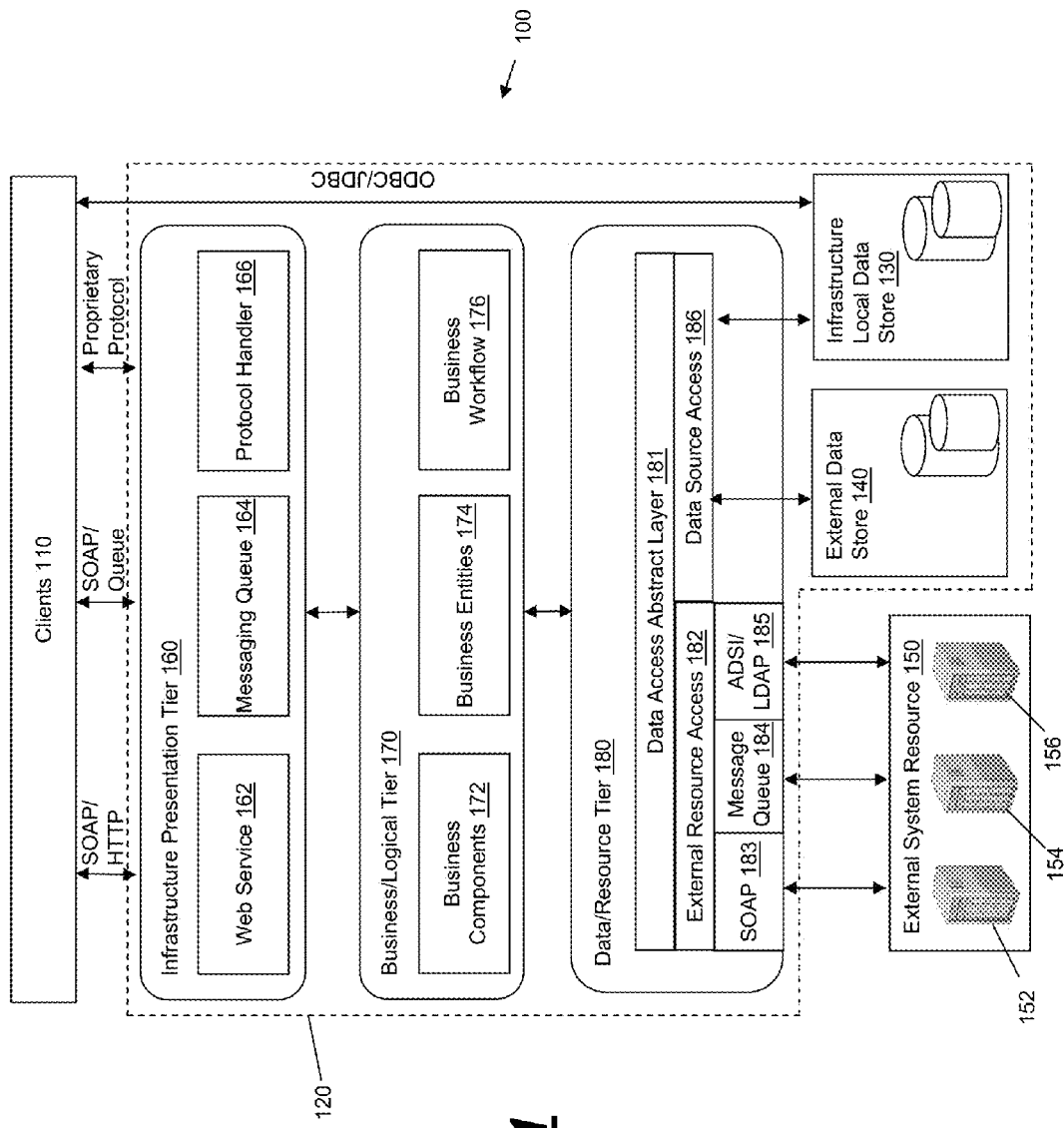
FIG. 1 shows a system architecture according to an exemplary embodiment.

Reference will now be made in detail to the preferred embodiments of the present invention, examples of which are illustrated in the accompanying drawings.

Embodiments described herein can combine, change and properly route information from disparate sources of infrastructure data, such as a Human Resource Management System (e.g., PeopleSoft), directory services (e.g., Active Directory by Microsoft or Netegrity by Computer Associates), a facilities management system (e.g., Total Infrastructure Facilities Management by ARCHIBUS), a technology asset management system (e.g. Asset Center by Hewlett-Packard), a network management solution (e.g., CiscoWorks by Cisco), and data security system (e.g., Enterprise Security Manager by Symantec or Documentum by EMC). A single system is required to access each of these different infrastructure data sources so that personnel can be more useful and improve overall productivity. For example, personnel may need to make decisions based on information spread across different systems, different business units and physical locations. The decisions may be rooted in questions such as: who is the manager of an employee, what data does an employee have access to, where does an employee physically sit in the company, which network switch ports is an employee's laptop using, what is the total cost of technology consumed or utilized by an employee, what software does an employee use and how frequently does he use it, how often does an employee enter a particular building?

Infrastructure management systems are used to enable a broad range of changes—from incremental to massive—that organization's experience throughout their lifetime. Organizations change all the time due to hiring, firing and job reassignments and departmental reorganizations. Organizations may also rapidly grow and shrink due to mergers, acquisition and divestitures. Allocation and replenishment of resources is required for organizations to transform from its current state to the desired target state. Infrastructure management systems, when designed and managed correctly, can enable efficient organizational transformation whereas poor design may hinder or delay organizational transformation.

Hundreds or thousands of employees can be relocated or reassigned within a company every month. Each change in the organization (e.g., reorganization), real estate (e.g., strategic move), employee function (e.g., promotion), or employee status (e.g., termination) will impact resource allocation, resource utilization, financial performance and other key metrics. Therefore, the most accurate information must be available to the organization's decision makers and to enable efficient processes.

In one particular example, a directory service such as Microsoft's Active Directory (also referred to as "AD") can be significantly impacted by organizational change. AD is used by system administrators to store information about users, assign security policies, and deploy software. Although the exemplary embodiment recites the use of a directory service, such as Active Directory, the system is intended to operate with any type of infrastructure data source and can integrate any number of disparate data sources. Active Directory can be used in small environments with a few users or in a global environment with hundreds of thousands, even millions, of users. Active Directory functions as a place to store information about people, devices (e.g., computers and printers), applications, domains, services, and security access permissions; in addition, it also maintains the relationships these objects shared with each other. As an enterprise's single source of these relationships, the information stored by Active Directory can be used by "AD-Aware" applications to enable information services required by an organization to function. For example, the Microsoft Windows operating system depends on Active Directory to authorize a user for system access. If an end-user has been allowed to login to a particular computer, Active Directory will first authenticate the end-user's identity; then Microsoft Windows will provide access to the computer based upon the security rights (also known as permissions) granted to the authorized user. If a user account is disabled in Active Directory, then Windows will prevent the user from logging in.

Active Directory groups can be used for security or email distribution list functionality. A security group contains accounts for security access, such as assigning rights to a particular directory on a file server. A distribution group is commonly used to track members of an email distribution list, which is by Microsoft Exchange to manage email. Members of security groups have access to resources contained within Active Directory or to resources provided by AD-Aware applications.

Though applications can be AD-Aware, Active Directory is not necessarily aware of the applications which depend on it. While the two distinct systems complement each other and provide a seamless experience to the application's end-user, each system alone cannot provide complete information to the enterprise report end-user or other applications which need to know how an employee is configured in Active Directory and how the same employee is configured to use an AD-Aware system. For example, an AD global group can be used to permission access to a high-risk document on an AD-Aware file server. If a reporting or security management application must provide information on the list of employees with access to the document, it could only provide the name of the AD global group, not the actual members of the global group. On the other hand, if the reporting system were to scan AD global groups and the members, it would not be aware of the infrastructure resources where the AD global groups have been permissioned. A systemic method to capture the AD global groups, AD group memberships and file system permissions is essential to running an organization's infrastructure.

In many organizations it is common practice to implement different vendor solutions for directory services, such as Active Directory by Microsoft or Netegrity by Computer Associates. Most directory services are based on Lightweight Directory Active Protocol ("LDAP"), which is a standard application protocol for querying and modifying directory services.

An LDAP directory tree is a hierarchical structure of organizations, domains, trees, groups, and individual units. LDAP allows an application to obtain directory information, such as e-mail addresses and public keys. Though directory services are designed to simplify administration and use of technology products and services across an organization, managing directory services can be a challenging task for an organization. With each change the effort to manage infrastructure systems becomes and the directory services grow more complex as the organizations become larger. A large organization, such as one with thousands of Microsoft Windows servers, thousands of Unix servers, and hundreds of thousands of workstations, creates a vast and complex infrastructure data set. A history of mergers, acquisitions, and divestitures of other entities adds to the complexity of the organization. The complex data set includes various upstream and downstream feeds using different methods of transfer and differing security schemes (e.g., file transfer protocol ("FTP"), ETL, and flat files on shares). The thousands of workstations have resource needs such as shared drives, printers, and various software assignments.

Administrators can set policies and information that a certain software application should be deployed to a certain user. But Active Directory does not deploy the software. Instead, a Microsoft Windows service reads the information from Active Directory and then installs the software.

Administrators can also delegate specific authority over certain parts of Active Directory to other administrators, team members, and groups. Active Directory can have a varied hierarchical structure based upon a single unit or broken down by geographic location (e.g., North America, Europe, and Asia) or department (e.g., accounting, marketing, and sales). Active Directory uses Domain Naming System ("DNS") to name domains, computers, servers, and locate services. DNS can be used to find domain names, as well as objects and their IP addresses. Active Directory starts with forests and domains, then expands into organizational units and individual objects (such as a user or an account). A forest, at the top of the hierarchy, holds all of the domains, objects, organizational units, and attributes. The forest can have one or more trees that hold domains, organizational units, objects, and attributes. Domains, often named like an Internet website (e.g., Citi.com), are the next level in the hierarchical structure. Trust relationships allow forests and domains to communicate with each other and pass credentials. Within a single forest, trusts are created when a domain is created. By default, domains have an implicit two-way transitive trust so that each domain trusts each other for security access and credentials. A user in domain A can access resources permitted in domain B whereas a user in domain B can access resources permitted in domain A. An organizational unit is a container that can reflect a company's geographic or organizational structure. Each organizational unit can have different security rights and administrative responsibilities.

Referring to FIG. 1, an exemplary system 100 is shown for allowing access one or more disparate databases and/or directory services and providing cross-platform functionality. In one example, the system has a directory service, such as Active Directory. In another example, the system has another database, such as a human resources database that stores employee statuses. A human resources administrator may update the database to reflect a new employee hire or the termination of an employee. In yet another example, a database stores data regarding employee rights to computers, cellular phone or personal data assistant information, and e-mail access. An information technology administrator may update the database to reflect a new cellular phone assigned to an employee or a new e-mail distribution list to be created. These databases and directory services are typically updated by an administrator that updates, adds, and deletes entries. The system described herein can allow the information in at least one database to be managed by limited personnel, updated in real time, and accessed by various clients.

A client 110 can be either a person, an entity, a software application, or a system. One example of a client is an information technology administrator or information security administrator. This person or group of people may need to activate or deactivate a cellular phone or an e-mail address based on a change in an employee's status, such as a new hiring or termination of an employee. In an example of a client as an application, a person or entity can use software or systems that can automatically handle requests for compliance or efficiency. For example, when requesting a new e-mail distribution list, a client application can verify whether the e-mail distribution list already exists. A custom client application can take the form of both a software application and external system for compliance purposes.

One example of a client application includes a user account compliance platform that can be used to ensure that every employee having an account in Active Directory has access to system resources as needed. Another exemplary client application includes on-boarding for basic software provisioning. Yet another exemplary client is a user resources application. The user resources application allows a user to use the system to return information, without any noticeable impact to the user. The user resources application identifies the user, determines which applications are required on their desktops, and which resources the user requires access (e.g., drive mappings and network printers). The user resources application may rely on two types of data sources: proprietary user resources data and Active Directory. Previously, LDAP calls were used to gather Active Directory data, which was costly because a large Active Directory infrastructure was need to handle the volume, each individual call to the database took a long period of time to complete, and regional Active Directory deployments make simple queries overly complicated due to the cross-domain relationships of accounts. In employing the system, the user resources application can return information, such as group and cross-domain membership, and obviates the need for applications to make such resource intensive direct queries to Active Directory.

In an example using ARCHIBUS's Total Infrastructure and Facilities Management platform (which receives the coordinates to provide a virtual map of a floor layout) the system described herein can assist in providing the coordinates of an employee's physical location and allocated resources. A client application can then use the employee and space information to locate a cubicle/office relative to the current employee and locate nearby resources, such as printers, fax machines, and copy machines. The employee can also use the client application update his precise location, which utilizes the system interface. A real estate or facilities department can use this information to allocate resources or get a more accurate read of capacity.

The clients 110 can manage, update, and access the databases for various purposes and across various platforms. A corporate infrastructure management system ("CIMS") 120 can provide this functionality to the clients 110 through an enterprise service bus. Generally, CIMS 120 resides on at least one computer, which can be at least one server and at least one database. In one embodiment, CIMS 120 can reside on a single computer having the functionality of a server and a database. CIMS 120 has a web service and a data service. The web service can be provided on at least one server. Additional servers can be added for better performance or for functionality. The web service provides a connection to the data service. The data service can be provided on at least one database and a server. The database stores a generic representation of useful data from other databases. The web service allows access to the data service for use by client applications. CIMS 120 can provide two types of data access, a web service or a database connection. CIMS 120 can be an application programming interface ("API") accessed over a network, or CIMS can execute a database function and bypass the web service (e.g., processing a report from a database).

The data service in CIMS 120 stores a generic representation of selected information, including attributes and objects, from at least one database and/or directory service. The generic representation can be stored in an infrastructure local data store 130, which can be a local database coupled to a CIMS server. Clients 110 can access the infrastructure local data store 130 to collect, store, and process value-add information from the at least one database or directory service. The client 110 can access the infrastructure local data store through CIMS 120 or directly via open database connectivity ("ODBC"), Java database connectivity ("JDBC"), FTP, or other "open" communications protocols.

The infrastructure local data store 130 duplicates the database and/or directory services in substantially real-time into a generic representation. CIMS 120 can download the information from the database or directory service, including dozens of global domain controllers, in a short time period. Storing the information in a generic version allows more functionality, whereas a proprietary directory services schema, such as Active Directory, cannot be easily extended to represent organization-specific information. Although a SQL-based platform is described herein, it is intended that the CIMS platform can be based on any similar relational database. Many third party and proprietary system databases are not based on a relational database and so there are issues concerning scalability and interoperability. In contrast, CIMS 120 is configured to be open to multiple platforms. Each vendor uses their own platform and format, so the SQL format allows CIMS 120 to integrate the disparate systems in a scalable manner. In the exemplary embodiment, the infrastructure local data store 130 is a SQL server that stores a SQL representation of the objects and attributes in a database. Additionally, the infrastructure local data store 130 can store additional attributes and objects. Further, because CIMS 120 maintains the generic representation of an organization's infrastructure databases, a system administrator does not need to manually address each directory service with a request. No available middleware has this functionality.

CIMS 120 is configured to allow for scalability amongst various sized organizations, security for compliance and approval processes, reliability, and availability. CIMS 120 is a secure, centralized infrastructure system that ensures that business applications have a complete separation from the infrastructure sources. For example, no user or client can directly access directory services. CIMS 120 also centralizes all infrastructure access so business applications do not need to have knowledge of the underlying systems and additional workflow can be performed as needed, extends the data set beyond the original sources to the infrastructure data, and adds additional value by associating data among the multitude of infrastructure sources.

CIMS 120 maintains a duplicate of selected information in the infrastructure local data store 130. When maintaining an identical state between the infrastructure local data store and a database and/or a directory service, there are some challenges associated with ensuring data integrity and making sure the information is synchronized. For example, extracting data from Active Directory into SQL can be especially challenging when the organization has many domains and LDAP servers. Accordingly, CIMS 120 can synchronize every few seconds with Active Directory. Initially, CIMS 120 copies the entire Active Directory and stores the information in the infrastructure local data store 130 in a SQL format. Subsequently, each synchronization involves copying only the changes to the Active Directory, not the entire snapshot. Each object has a time stamp, and CIMS 120 can update all objects that have changed since a particular time. When data is written, CIMS 120 writes to the Active Directory, then CIMS 120 is updated to reflect the changes to the Active Directory. Active Directory has its own replication schema that must be synchronized as well. As a result, CIMS 120 can make changes to a primary Active Directory server to ensure there is no time gap of Active Directory's own replication procedures.

When updating the infrastructure local data store 130, CIMS can maintain a log of all changes to the data. For example, if a client inquires about membership of a particular group from two weeks ago, the log can provide this information. In another example, the log can show when a person changed their password. CIMS 120 maintains this history in a CIMS object history database, which can be a component of the infrastructure local data store 130 or locally coupled thereto. The history can be useful for general inquiries and compliance purposes.

Previously, many system administrators were needed to handle requests to modify an employee's access specified in a directory service. Each system administrator has varying security roles and access to the directory services depending on their function or the business they support. By replicating the directory services in a SQL format in CIMS 120, the directory service is represented in real-time along with extended attributes (e.g., who is the owner of a group or what the group is used for), thereby allowing client 110 to provision their own changes instead of waiting for a system administrator to make changes manually. In one example, a client can obtain access to a shared drive or get access to applications without the extensive handling by system administrators, as previously required. Compliance reporting can also be streamlined, because CIMS can report directory services directly from a central source. A well-defined interface between CIMS and a client application allows the system to easily conduct provisioning reporting operations.

CIMS 120 passes along updates as necessary so that related systems reflect the changes made to the infrastructure local data store 130. In other words, CIMS 120 can reconcile the required state versus the actual state. Reconciliation can occur on command or on a periodic basis, e.g., weekly. A required state indicates an access level or resources needed by an individual. An actual state includes an access level or resources currently provisioned to the individual. CIMS 120 can match the required state with the actual state along with the corresponding entitlements. An entitlement can be an access control as defined by a security policy. In one example, an employee that needs access to a locked room and should have access is automatically given access upon reconciliation. In yet another example, if a user has access to restricted data and should not, then CIMS 120 will remove the user from the group with access. If a user needs human approval for access, client application 110 can use CIMS 120 to initiate the approval process.

The infrastructure local data store 130 does not store all data from the directory services and databases. Instead, the infrastructure local data store 130 stores select attributes, and can add additional attributes to each object. Besides the stored attributes of the objects, CIMS 120 is designed to allow for growth of the directory services as well as the information to be used by various client applications. Attributes can be added to the objects, such as a contact person for a group. In another example, information about an employee (e.g., name and phone number) can be added as attributes and affiliated with the employee identification number. Directory services can store thousands of attributes, but CIMS 120 only requires a few of those attributes. Similarly, each vendor's system may require thousands of attributes, but CIMS 120 only requires a few. Additionally, CIMS 120 can create custom attributes based on the standard operating environment. Directory services, such as Active Directory, include a name, description, and exchange server for each object, along with hundreds or dozens of attributes. CIMS can use the name and description, along with other user-defined attributes. CIMS 120 stores the objects, the select attributes, and any other user-defined attributes.

There are various types of objects and attributes that can be associated with those objects. The following describes some object types along with some attributes associated with those object types. Some attributes may be generated from a directory service and others may be user-defined in CIMS.

CIMS can store information about resources within the Active Directory. For example, information about printers can be stored in an attribute called "PrinterMapping." If the user is a member of the group under PrinterMapping, then the user can access to that printer. When the user logs in, a client on the user's workstation asks CIMS which printers the user has access. CIMS reads the printer mapping and maps the workstation to those printers. As a result, a system administrator is not needed to manually map the printers.

CIMS can also create and store information about different account types required to run an organization, such as an employee account and a functional account. An employee account is one that is used by an employee and maps directly to a record in the employee database. A functional account is used by applications to function in an enterprise environment and does not map to a record in the employee database. CIMS is capable of adding additional attributes to functional accounts and employee accounts that are not native to Active Directory, such as the support contact.

CIMS 120 can also incorporate information from a technology system inventory database, which stores information about machine inventory, including servers, workstations, laptops, software, operating systems, and hardware, as well as the configuration and security of those machines. The infrastructure local data store 130 can include a machine asset inventory service that communicates with the technology system inventory database and stores information in a machine asset inventory database. CIMS can read from and write to the technology system inventory database. The infrastructure local data store 130 can also include a contact directory for providing data such as employee contact information.

Additional information can be stored in an external data store 140. The external data store 140 can be data stored in a location external to the CIMS 120 system. CIMS 120 can access unprocessed information from the external data store 140 to add functionality, such as validating information or providing other operational data sources. By accessing CIMS 120, a client 110 can access the functionality of both the infrastructure local data store 130 and the external data store 140. In one example, if a client 110 is submitting a request to delete an employee's access, a ticket number may be required for the completion of the task. CIMS 120 can verify that the ticket is a valid ticket and confirm the task itself by accessing the ticket information stored in the external data store 140.

CIMS 120 allows a client 110 to read, write, and access information in external system resources 150. The external system resources 150 include a database such a directory service, a human resources database, or any other database storing infrastructure data. For example, the external system resources 150 can include at least one Active Directory domain. A first Active Directory domain 152 can be used for North American locations. A second Active Directory domain 154 can be used for European locations. The external system resources 150 can also include a human resources database 156.

The client 110 can read from each of the external system resources 150. CIMS 120 reproduces select data in the infrastructure local data store 130. When the client 110 reads information, CIMS 120 provides the information from the infrastructure local data store 130.

The client 110 can write to the external system resources 150. When processing a request to update information in the external system resources 150, CIMS 120 writes to those databases or directory services in the external system resources 150. The updates to the external system resources 150 are then updated in the infrastructure local data store 130.

CIMS 120 employs a multi-tier system to collect the data, aggregate the data from different sources, report the data, and change the data. In this exemplary embodiment, CIMS 120 is structured to have three tiers: an infrastructure presentation tier 160, a business/logical tier 170, and a data/resource tier 180. The infrastructure presentation tier 160 receives requests from clients 110 and provides requested information to clients 110. The infrastructure presentation tier 160 can handle different formats of requests. As a web service 162, the infrastructure presentation tier 160 can receive SOAP and HTTP requests. As a messaging queue 164, the infrastructure presentation tier 160 can receive SOAP and Queue requests. As a protocol handler 166, the infrastructure presentation tier 160 can receive requests in a proprietary protocol. As a result, the infrastructure presentation tier 160 is able to communicate with various clients 110 operating on various platforms. A user interface is not always needed for each client 110 accessing CIMS 120. Additionally, each client 110 can access CIMS 120 in a different fashion for a different purpose.

Directory services, such as Active Directory, can manage access through authentication and authorization to various aspects of the system. Directory services can manage database access (e.g., using Microsoft Access, ODBC), data access (e.g., on the file system), workstation and server access (e.g., for laptops, desktops, and virtual machine servers), network and remote access (e.g., through a Citrix remote access connection), application processes (e.g., Sharepoint and websites), and messaging requests (e.g., e-mail, personal data assistant, and cellular phones). Because the directory services act as a backbone to enterprise solutions, appropriate governance is needed to manage access.

The business/logical tier 170 acts as a governance layer. The business/logical tier 170 addresses requests passed from the infrastructure presentation tier 160, such as reporting and workflow functions, which can be based on business components 172, business entities 174, or business workflow 176. The business/logical tier 170 creates and applies business logic and rules to ensure the information is maintained in a secure, structured, standard, and repeatable way. The business/logical tier 170 can also automate many complex infrastructure management functions to reduce manual workflows so that business application developers can focus on the core business processes rather than figuring out the underlying complexities. By centralizing infrastructure information, CIMS 120 can enable applications to become fully automated, thereby drastically reducing infrastructure and staff hours required to manage both legacy and strategic applications. The business/logic tier 170 knows where to access information based on the type of information requested.

The business/logical tier 170 can also eliminate human error, non-privileged access to applications, and the costs associated with manually administering the audit and review process. As clients 110 interact with CIMS 120, implicit compliance and audit workflows can be instantaneously created. For example, any client 110 request through CIMS 120 can be automatically reviewed and justified. Because a system is performing these transactions rather than an individual, manual event justification and review can be rendered obsolete. This streamlining of the audit process can save a large corporation hundreds of thousands of man-hours. Furthermore, because all requests passing through CIMS 120 are proxied, non-standard privileged access to underlying core infrastructure assets can be eradicated.

For example, when a request is submitted to CIMS 120 to add a user to a group, the request is given a ticket that specifies the action to perform, an identification of the user, a group name, and a ticket number. The business/logical tier 170 validates the request by matching the action against the approved ticket that is held in the external data store. 140. The business/logical tier 170 will not allow the request to proceed unless each parameter of the ticket is validated.

The data/resource tier 180 is the interface for various outputs. A data access abstract layer 181 routes a request to read or write from an internal data source access 186, such as the infrastructure local data store 130 and the external data store 140, or from the external system resource 150 through an external resource access 182. The data/resource tier 180 can access to external system resources 150 outside of CIMS 120 using, for example, SOAP 183, messaging queues 184, as well as ADSI and LDAP 186. Using the exemplary system architecture described above, CIMS can provide a number of benefits that are not available in conventional systems.

The following examples can be used to show the operation and benefits of CIMS.

In a first example, CIMS can provide compliance and automated functionality for handling the accounts of terminated employees. When an employee leaves an organization, a conventional method requires manual processes by numerous individuals to remove the employee's entitlements and return resources to inventory, like software licenses. A human resources database is updated to reflect the change in the employee's status. A business line manager would send a request to an information technology administrator or information security administrator to disable a terminated employee's accounts. The information technology administrator would attempt to locate all of the employee's accessed accounts and proceed with disabling each of them.

CIMS can provide this functionality in an automated matter that satisfies compliance needs. The human resources database is updated with the employee's status as terminated. A user account compliance platform client application can automatically scan the human resources database for status changes and update CIMS accordingly. CIMS, upon its next refresh, will reflect that the employee has been removed. CIMS can send a warning to end users or notifications to approval entities through the business/logical tier and process a request to disable the account automatically. CIMS allows the central control by knowing an individual's access according to department, job function, location, or other characteristic, and can provision the individual accordingly. However, CIMS is not limited to functions involving employee termination and can be applied to various employee status changes, including job changes, hiring additional similar employees, changing physical locations, or any other situation where access is given to or taken from the employee.

In a second example, CIMS can validate the creation of a new e-mail distribution list. In conventional methods, a user submits a request to an information technology administrator to create a distribution list, assign an administrator for the list, and add the members of the list. CIMS can operate with a client application that allows a user to request an e-mail distribution list. CIMS receives the request and verifies whether the distribution list already exists. CIMS can also verify whether the requested members are entitled to be on the list. Once the distribution list has been verified, CIMS can allow the creation of the list and update the necessary directory services and databases.

In a third example, CIMS can provide an account impact report. CIMS can collect information, process it, and make it available to users. Directory services can provide information regarding an employee and its membership to various groups, but cannot provide cross-domain membership, file system access, machine group membership, database access, remote access, or e-mail access. Also, directory services tools can show some nested group membership, for example, by showing an employee is an object nested with a business unit, which is nested within a location. But directory services tools will not show what groups the user has access based on that nested relationship. CIMS can provide that information. For example, if a user account is a member of a group called "New York" and "New York" is a member of three other groups called "USA," "North America," and "The World,", CIMS can show that the account is a member of New York, USA, North America, and The World in a manner that explains the relationship.

An organization may have one or more directory services, such as Active Directory or other identity management systems. Directory services store information regarding a user's information, entitlements, and access. An Active Directory has a forest which contains a group of domains. The domains can reflect the organizational structure, wherein each domain represents a geographic division of the organization. In one example, domains can include Asia Pacific, Europe, and North America. Each domain is self-contained and Active Directory does not allow a user to be a member of multiple domains. As a result, it can be difficult to assess a user's entitlements in two different domains. As an analogy, if a first domain is a bank account at Bank A and a second domain is a bank account at Bank B, then Active Directory requires an inquiry to the first domain and the second domain to get a statement from each Bank A and Bank B. It is desirable, however, to have the ability to generate a single statement from both Bank A and Bank B. CIMS can provide cross-domain reporting, something not easily achieved by Active Directory or other directory services.

A large organization can have one or more directory services housing data with user (e.g., employee) information (including extended attributes for drive mapping), application entitlements for login processing, source hardware data (including shared directory), local user entitlements, and installed server data. CIMS can reduce manual workflows and centralize infrastructure information so that business application developers and infrastructure staff could be more productive. CIMS can aggregate, enrich, relate, and arrange infrastructure information from disparate sources.

Directory services maintain entitlements of users based on effective group membership. CIMS enhances cross-domain membership and can provide a path of membership. Direct membership includes those groups where the user is a member. Indirect membership is membership in a group within a group, so a member of a child group is a member of a parent group. Effective membership includes both direct and indirect membership. In order to find out if a user is a member of a particular group, directory services require a review of each group and related group to see if the user is a member, and then the user can be added or removed to each group as necessary. No other product provides effective membership. CIMS, however, provides an efficient mechanism for showing every group and related group where the user is a member.

Figure 2:
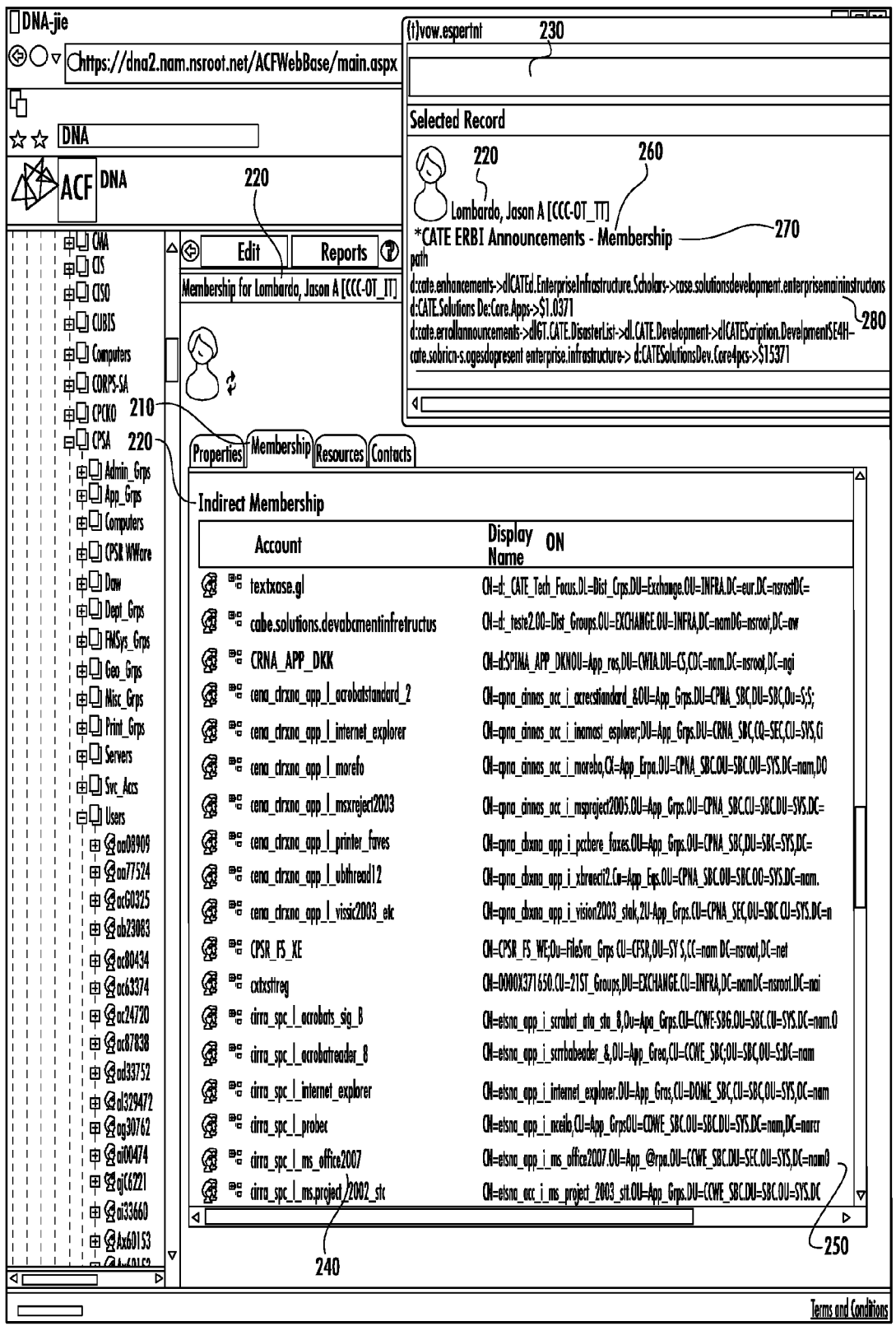
FIG. 2 a screenshot of a membership tab for a user according to an exemplary embodiment.

As shown in the screenshot of a membership tab 210 in FIG. 2, a user can ask which groups an employee 220, Jason Lombardo, is a member. CIMS can list each account 240 and its corresponding distinguished name 250 of which that employee 220 is a member. If the employee 220 has access to restricted data, then CIMS can show the selected employee's membership to see how the employee 220 has access to the restricted data. CIMS can provide information regarding the employee's effective membership in various groups, including indirect membership. For a selected group 260, a group hierarchy window 230 can provide information regarding the effective membership 270 of the employee 220 in that group 260. CIMS can list each path 280 to identify any and all indirect and direct relationships that indicate how the employee 220 is a member of the selected group 260.

The access to the group membership can be useful in various instances. In one example, if a system administrator desires to remove a user from all groups, such as when an employee is terminated from a company, the system administrator can access this path to ensure that the employee is removed from each group where there is a direct or indirect membership. In another example, when a new employee is to be added to groups, the system administrator can compare another employee's membership and add the new employee accordingly. In yet another example, nested groups across domains can be hard to manage, so CIMS adds transparency to the nested group relationships.

CIMS can also be used for relationship mining. CIMS mines disparate data and finds relationships between persons, places, and things. For example, an organization can find all systems accessed by a single employee. In another example, an organization can find all employees with access to a single system. In an example of external use for homeland security, it is possible to determine activity for a single person within various databases, such as border crossings, credit card transactions, and phone calls. CIMS can detect how distinct persons, places, and things are related. CIMS utilizes policies to describe relationships that are allowed and prohibited. Prohibited relationships are candidates for "auto-cleansing." CIMS uses an algorithm that finds a unique identifier of objects and finds where the unique identifier exists in other objects. For example, a user's identification number can be used to find where it exists in domain and local groups. The group's identification number can be used to identify all resources to which it has access.

CIMS can be used to perform an audit of access for an individual. For example, CIMS can provide a listing of access to buildings, e-mail, cell phone, and software. This listing can provide useful for automated or manual changes to the individual's access, as well as auditing purposes.

In a fourth example, attributes can be added to each object from the directory services. CIMS adds more attributes to each object in AD, such as contact info, ownership, resource assignments (e.g., printers). The infrastructure local data store stores objects from the directory services as well as attributes. The attributes can be directory services attributes and user-defined attributes. The attributes can be presented to clients as fields for entering information to be stored as an attribute. The data in the fields can also be stored as an attribute. A new field may be assigned to all object associated with a certain account. In another example, a client may want to track the tasks performed by an information security officer assigned to certain objects.

Figure 3:
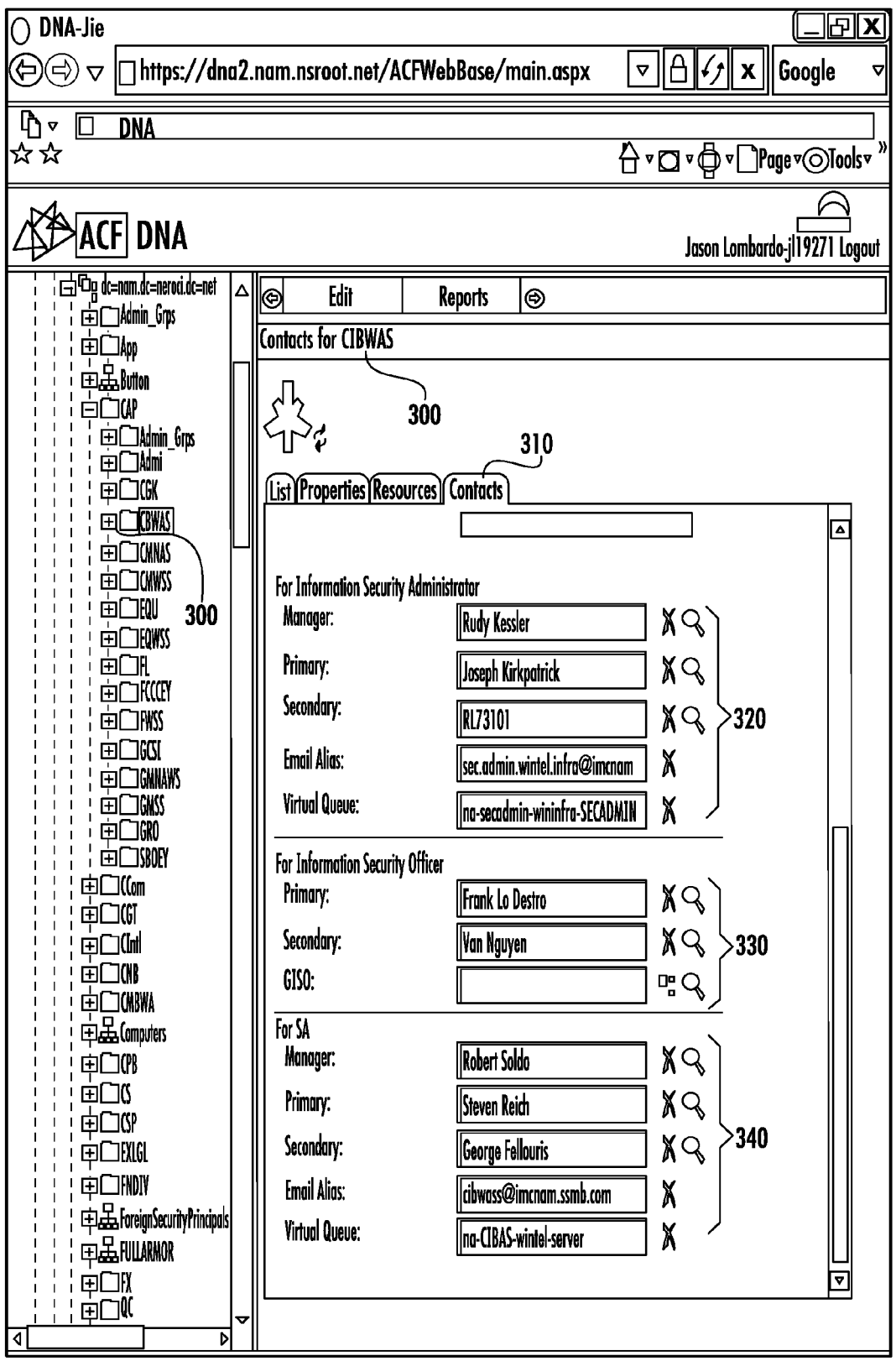
FIG. 3 shows a screenshot of a contacts tab for a group according to an exemplary embodiment.

Referring to FIG. 3, a screenshot of a contacts tab 310 is shown for a group called CIBWAS 300. While the CIBWAS group 300 may have some attributes in Active Directory, Active Directory will not have additional attributes such as a contact name. CIMS can add additional attributes 320, 330, 340 to enrich the description of directory services objects. The attributes are stored in the infrastructure local data store and associated with the objects, and the directory services are not changed. Attributes 320 can be contact information for an information security administrator. These attributes 320 can include a manager, primary contact, secondary contact, email alias, and a virtual queue. CIMS stores the attributes, including the fields and the value entered in the fields. Attributes 330 can be contact information for an information security officer. These attributes 330 can include a primary contact, secondary contact, and GISO. Attributes 340 can be contact information for a system administrator. These attributes 340 can include a manager, primary contact, secondary contact, email alias, and a virtual queue. In this example, the additional attributes are contacts. CIMS can even have the contacts validated against the employee database and e-mail system to ensure the contacts are still employed and the e-mail addresses are still active. When managing groups and relationships, a client can view contacts for a particular group through CIMS, even though such functionality is not available for those object in the directory services. The business/logic tier can implement business rules requiring that anyone added to a group must first be approved by an information security administrator, reviewed by an information security officer, and permissioned by a system administrator. CIMS automatically implements the business rule and can send e-mails where appropriate to these contacts once the request is made.

Figure 4:
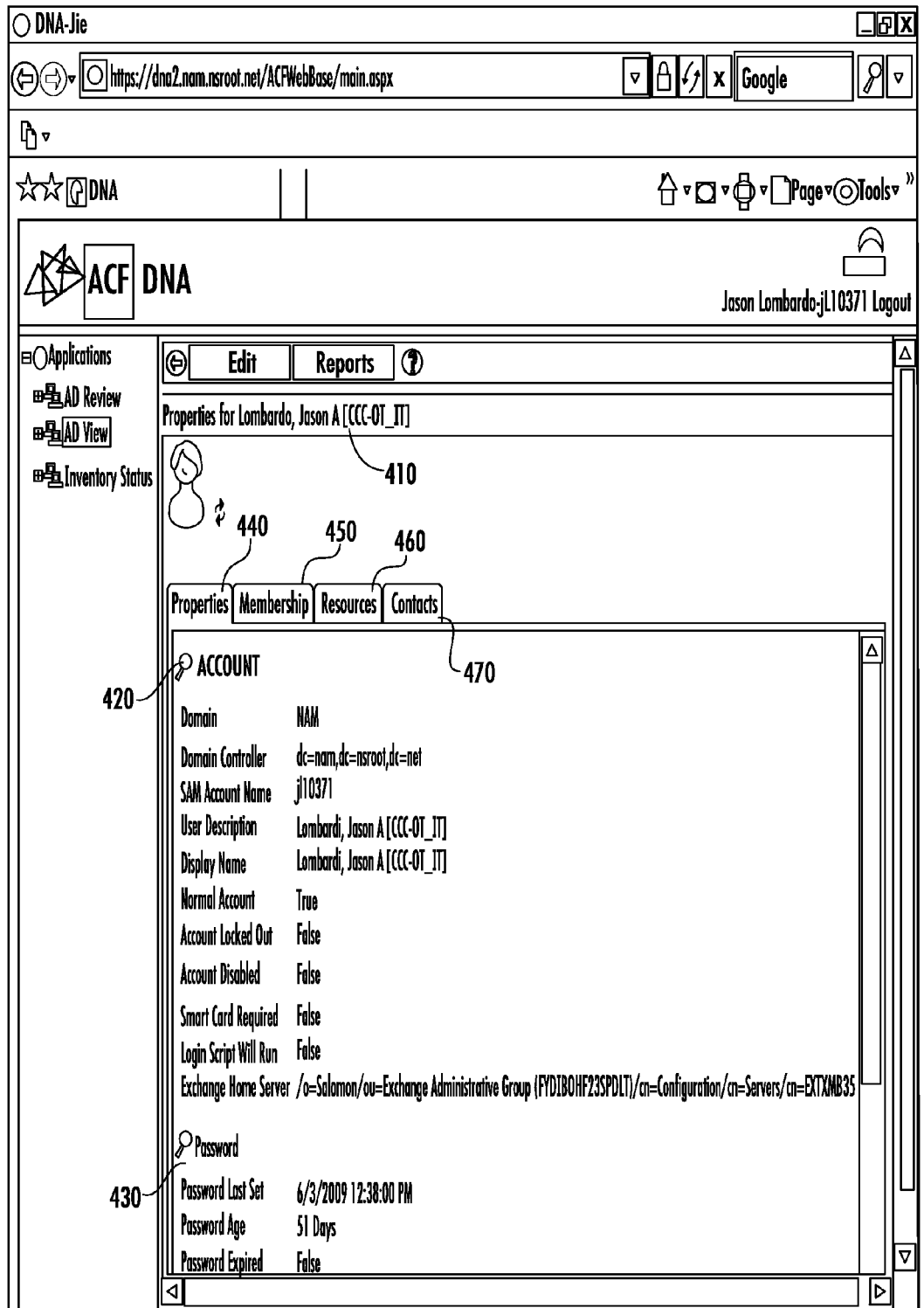
FIG. 4 shows a screenshot of a information tab for a user according to an exemplary embodiment.

Referring to FIG. 4, properties 440 for an object 410, here a selected employee Jason Lombardo, is shown. The properties 440 can include account attributes 420, including domain, domain controller, SAM account name, user description, display name, normal account, account locked out, account disabled, smart card required, login script will run, and exchange home server. The properties 440 can also include password information 430, including password last set, password age, and password expired. These properties are attributes associated with the object. In this example, some attributes are taken directly from Active Directory whereas others are user-defined. User-defined attributes are added by the CIMS developer and maintained automatically by CIMS. These attributes are shown as read-only properties. These properties are the actual state of an Active Directory attribute, user-defined attribute, or some data derived from the information in an attribute. Derived information includes the age of a password, which is based on the date the password was last changed. For each object, a user can optionally select to view information including membership 450 (shown in FIG. 2), resources 460, and contacts 470 (shown in FIG. 3).

In a fifth example, CIMS can provide maker-checker functionality. A requester can submit a ticket to entitle a user to access restricted data. The business/logical tier will send an e-mail to an administrator or manager of the restricted data, as described above with respect to FIG. 3. Once the administrator or manager approves the user's access to the restricted data, access can be granted to the user. A third party auditor may desire to verify the process whereby the user received access to the restricted data. The auditor may desire to see the request and proof of completion. CIMS tracks the request, the generated ticket, the approval of the request, the confirmation of the granted access, and the closing of the ticket. As a result, the auditor can see the validation of this request through each stage of the process.

CIMS can offer various benefits. CIMS acts as a layer between the directory services and a business application and can enable users to immediately acquire the resources essential for performing their daily tasks; provide a mechanism for instantly creating, modifying, and delivering infrastructure information that used to take hours or days; improve the efficiency of systems interfacing with it while reducing costly infrastructure; ensure audit and regulatory requirements are satisfied by automatically creating and recording a history of all application transactions; eliminate the cost overhead and human error associated with manual, time-consuming work currently performed by many systems administrators on each disparate system; and be transparent to end users, thereby defraying the costs of time off the job normally incurred with retraining CIMS can offer the functionality of the disparate applications and consistently interface with the various and changing underlying infrastructure. As a result, infrastructure providers do not have to communicate directly with a vast array of business applications. Instead, infrastructure service providers and client applications can focus on being more productive in the development lifecycle, such as designing, developing, and maintaining client applications.

CIMS can automate employee on-boarding, provision user resources during login (e.g., drive mappings and applications), manage self-service to organizational resources (via directory services or third party systems), manage self-serve password resets to systems and applications, manage helpdesk requests for shared drive access, automate desktop software provisioning, and manage infrastructure object ownership and attribute reviews. As a result of the load that can be handled by CIMS, fewer servers are required, thereby lowering the cost of the system.

In one embodiment, CIMS can be configured to be deployed in two sites having virtual addresses controlled by load balancers to dynamically detect and verify that each component was operating properly before being used. Consequently, if an entire site were to have an outage, the system would automatically detect this and failover, which would be transparent to clients who continue to work without interruption to access to their individualized resources and without requiring manual intervention by an operational team.

CIMS can provide various business features. For example, CIMS can be used for auto-cleansing data. CIMS collects, aggregates, enriches, reports, and takes actions to change data from disparate systems. Conventionally, data aggregators cannot "action" or change systems external to them. CIMS has a "cleansing" system that automatically or manually connects to remote systems to correct data problems. If CIMS detects that a data provider has given inaccurate data, CIMS connects to the data provider and changes the data so that it matches the required state.

CIMS can be used for business context enrichment. CIMS can enrich the raw data extracted from the data provider by adding business information which provide context to stakeholders. CIMS uses an algorithm to determine the correct business information to apply to persons, places, and things described by the data provider.

CIMS can be used for data pruning Unnecessary data can be pruned from the original source, reducing data storage requirements, improving performance and scalability. CIMS can be scheduled to synchronize at different times to accommodate time differences and system availability.

CIMS can be used as a data manager service. External systems can subscribe to the CIMS data provider to read and change system data.

CIMS can be used for an enterprise feed subscription. A system for providing changes to be immediately broadcast to subscriber systems. Data is like a "news feed," but its purpose is to send updates of any data change to downstream systems. For example, when an employee is terminated, the employee's account is disabled. CIMS notifies the subscriber(s) so that they can execute any necessary changes.

CIMS introduces the concept of an "enterprise" golden source—single system which provides access to authoritative sources of information as well as executing change against the underlying sources. Conventionally, golden sources come from a single information system or function, systems which are not infallible. Because an enterprise golden source cross-references multiple sources of duplicate information, it can also validate data. If data corresponds to two sources and a mismatch is detected, the mismatch can be identified as a data error and marked for remediation. Remediation can be either automated or manual. As more operational data sources are added to the enterprise data reporting system, cross-checking and validation can increase the probability of data reliability within a firm, or across organizations.

In implementing these systems and methods to be performed by a suitably programmed computer, it is intended that the computer have a processor and a computer readable medium, wherein the computer readable medium has program code. The program code can be made of one or more modules that carry out instructions for implementing the systems and methods herein. The processor can execute the instructions as programmed in the modules of the program code.

The systems and methods described can be implemented as a computer program product having a computer readable medium having a computer readable program code embodied therein, the computer readable program code adapted to be executed to implement a method for performing the methods described above. Each step or aspect can be performed by a different module, or a single module can perform more than a single step.

CIMS is described herein as software executed on at least one server, though it is understood that CIMS can be configured in other ways and retain its functionality. The above-described technology can be implemented on known devices such as a personal computer, a special purpose computer, cellular telephone, personal digital assistant ("PDA"), a programmed microprocessor or microcontroller and peripheral integrated circuit element(s), and ASIC or other integrated circuit, a digital signal processor, a hard-wired electronic or logic circuit such as a discrete element circuit, a programmable logic device such as a PLD, PLA, FPGA, PAL, or the like. In general, any device capable of implementing the processes described herein can be used to implement the systems and techniques according to this invention.

It is to be appreciated that the various components of the technology can be located at distant portions of a distributed network and/or the Internet, or within a dedicated secure, unsecured and/or encrypted system. Thus, it should be appreciated that the components of the system can be combined into one or more devices or co-located on a particular node of a distributed network, such as a telecommunications network. As will be appreciated from the description, and for reasons of computational efficiency, the components of the system can be arranged at any location within a distributed network without affecting the operation of the system. Moreover, the components could be embedded in a dedicated machine.

Furthermore, it should be appreciated that the various links connecting the elements can be wired or wireless links, or any combination thereof, or any other known or later developed element(s) that is capable of supplying and/or communicating data to and from the connected elements. The term module as used herein can refer to any known or later developed hardware, software, firmware, or combination thereof that is capable of performing the functionality associated with that element. The terms determine, calculate and compute, and variations thereof, as used herein are used interchangeably and include any type of methodology, process, mathematical operation or technique.

Moreover, the disclosed methods may be readily implemented in software, e.g., as a computer program product having one or more modules each adapted for one or more functions of the software, executed on a programmed general purpose computer, cellular telephone, PDA, a special purpose computer, a microprocessor, or the like. In these instances, the systems and methods of this invention can be implemented as a program embedded on a personal computer such as a JAVA®, CGI or Perl script, as a resource residing on a server or graphics workstation, as a routine embedded in a dedicated image system, or the like. The systems and methods of this invention can also be implemented by physically incorporating this system and method into a software and/or hardware system, such as the hardware and software systems of a computer. Such computer program products and systems can be distributed and employ a client-server architecture.

The embodiments described above are intended to be exemplary. One skilled in the art recognizes that numerous alternative components and embodiments that may be substituted for the particular examples described herein and still fall within the scope of the invention.

What is claimed is:

1. A computer implemented method for managing infrastructure data, the method comprising:
    replicating, by a server, secure data from one or more infrastructure data sources in at least a first format into a centralized database in a generic second format, wherein the generic second format includes an object and a selected attribute representing the secure data from the one or more infrastructure data sources;
    receiving, by the server, a request from at least one client application to write data to the one or more infrastructure data sources;
    writing, by the server, the requested data to the one or more infrastructure data sources;
    synchronizing, by the server, the centralized database with the one or more infrastructure data sources,
    wherein the one or more infrastructure data sources are directory services; and wherein the one or more infrastructure data sources are periodically replicated into the centralized database.

2. The method according to claim 1, wherein the one or more infrastructure data sources comprise employee data or inventory data.

3. The method according to claim 1, wherein the centralized database replicates the one or more infrastructure data sources in a SQL format.

4. The method according to claim 1, wherein the server periodically synchronizes the central database with the one or more infrastructure data sources.

5. The method according to claim 1, further comprising confirming, by the server, the completion of the request.

6. A computer implemented method for managing entitlements, the method comprising:
    replicating, by a server, secure data from one or more directory services into a centralized database in a generic format;
    determining, by the server, an actual state of a user;
    determining, by the server, a required state of the user;
    comparing, by the server, the actual state of the user with the required state of the user;
    if the user is not entitled to the required state, then the one or more infrastructure data sources are not updated to reflect the required state of the user, or
    if the user is entitled to the required state, then
        updating, by the server, one or more infrastructure data sources to reflect the required state of the user; and
        updating, by the server, the centralized database based on the update to the one or more infrastructure data sources,
    wherein the one or more infrastructure data sources comprise directory services.

7. The method according to claim 6, wherein the one or more infrastructure data sources are periodically replicated into the centralized database.

8. The method according to claim 6, wherein the centralized database replicates the one or more infrastructure data sources in a SQL format.

9. A system for managing infrastructure data comprising:
- at least one system resource comprising infrastructure data;
- at least one client application for requesting or accessing the infrastructure data from the at least one system resource;
- an infrastructure presentation tier for presenting an interface with the at least one client application;
- a business tier for implementing business rules regarding access to the infrastructure data;
- an internal data store for replicating infrastructure data from the at least one system resource, wherein the replicated infrastructure data includes an object and a selected attribute of the object representing the infrastructure data from the at least one system resource; and
- a data tier for accessing information from or writing information to the at least one system resource at the request of at least one client application,
- wherein the at least one system resource is directory services.

10. The system according to claim 9, wherein the data tier accesses an external data store.

11. The system according to claim 9, wherein the client application accesses the infrastructure data through a web service.

12. The system according to claim 9, wherein the infrastructure presentation tier accesses the infrastructure data through a web service.

13. A computer implemented method for accessing effective membership of a user in one or more infrastructure data sources, the method comprising:
- replicating, by a server, secure data from one or more infrastructure data sources in a first format into a centralized database in a second generic format, wherein the generic second format includes an object and a selected attribute representing the secure data from the one or more infrastructure data sources;
- receiving, by the server, a selection of a user;
- collecting all direct memberships of the user;
- collecting all indirect memberships of the user; and
- providing, by the server, a list of all direct and indirect memberships of the user,
- wherein the one or more infrastructure data sources comprise directory services.

14. The method according to claim 13, wherein the one or more infrastructure data sources are periodically replicated into the centralized database.

15. The method according to claim 13, wherein the centralized database replicates the one or more infrastructure data sources in a SQL format.

16. The method according to claim 13, wherein the data comprises an object for each user.

17. The method according to claim 13, wherein the centralized database stores attributes for each object.

18. A computer implemented method for accessing effective membership of a user in one or more infrastructure data sources, the method comprising:
- replicating, by a server, secure data from one or more infrastructure data sources in a first format into a centralized database in a second generic format, wherein the generic second format includes an object and a selected attribute representing the secure data from the one or more infrastructure data sources;
- receiving, by the server, a selection of a user;
- collecting all direct memberships of the user;
- collecting all indirect memberships of the user; and
- providing, by the server, a list of all direct and indirect memberships of the user,
- wherein at least one attribute in the centralized database is not stored in the one or more infrastructure data sources.

19. The method according to claim 18, wherein the one or more infrastructure data sources are periodically replicated into the centralized database.

20. The method according to claim 18, wherein the one or more infrastructure data sources comprise directory services.

21. The method according to claim 18, wherein the centralized database replicates the one or more infrastructure data sources in a SQL format.

22. The method according to claim 18, wherein the data comprises an object for each user.

23. The method according to claim 18, wherein the centralized database stores attributes for each object.

* * * * *